United States Patent [19]

Epstein et al.

[11] Patent Number: 5,131,957
[45] Date of Patent: Jul. 21, 1992

[54] MATERIAL PROPERTIES

[75] Inventors: Harold M. Epstein, Columbus, all of Ohio; Allan H. Clauer, Worthington; Boyd A. Mueller, Columbus, Mich.; Jeffrey L. Dulaney, Hilliard; Bernerd E. Campbell, Upper Arlington; Craig T. Walters, Columbus, Ohio

[73] Assignee: Battelle Memorial Institute, Columbus, Ohio

[21] Appl. No.: 676,140

[22] Filed: Mar. 26, 1991

Related U.S. Application Data

[63] Continuation of Ser. No. 463,577, Jan. 11, 1990, abandoned.

[51] Int. Cl.$^5$ .............................................. C21D 1/04
[52] U.S. Cl. ..................... 148/565; 148/903; 148/513; 219/121.61; 219/121.85; 266/249
[58] Field of Search ........... 219/121.6, 121.61, 121.85; 148/903, 1, 4; 266/249

[56] References Cited

FOREIGN PATENT DOCUMENTS 0319397 6/1989 France .

OTHER PUBLICATIONS

Jean Fournier, Generation of Shock Waves by High-Energy Pulsed Laser, Jun. 12, 1989.

*Primary Examiner*—Deborah Yee
*Attorney, Agent, or Firm*—Barry S. Bissell

[57] ABSTRACT

Methods and apparatus for improving properties of a solid material in a target (11) by providing shock waves therein. There are directed to the surface of the material (11) pulses of coherent radiation (12) having average energy fluence of at least about 10 Joules per square centimeter and rise time of not longer than about 5 nanoseconds within a fluorescence envelope lasting about 0.5 to 5 milliseconds, at a rate of about 1 radiation pulse per 100 to 200 microseconds.

The leading edge of each pulse (12) is sharpened by providing in its path an aluminum film (18) about 150 to 5000 angstroms thick that is vaporized by the pulse and then is moved across the path so that a later pulse (12) strikes an area of the film (18) not already vaporized by an earlier pulse (12).

The radiation (12) is amplified by an amplifier (23) comprising a rod of phosphate laser glass that was strengthened by an ion exchange process.

52 Claims, 2 Drawing Sheets

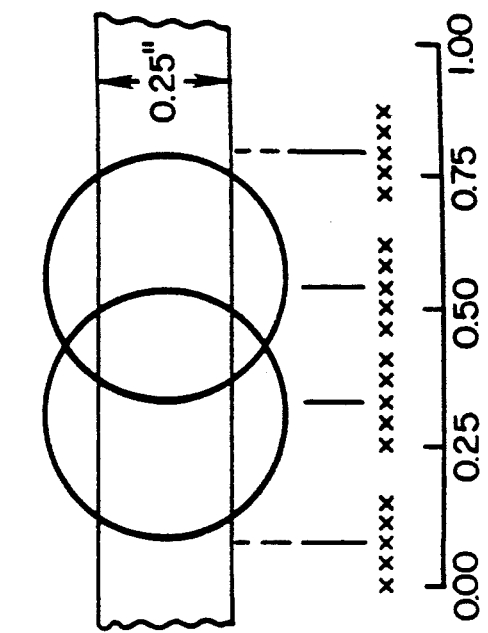
FIG. 5
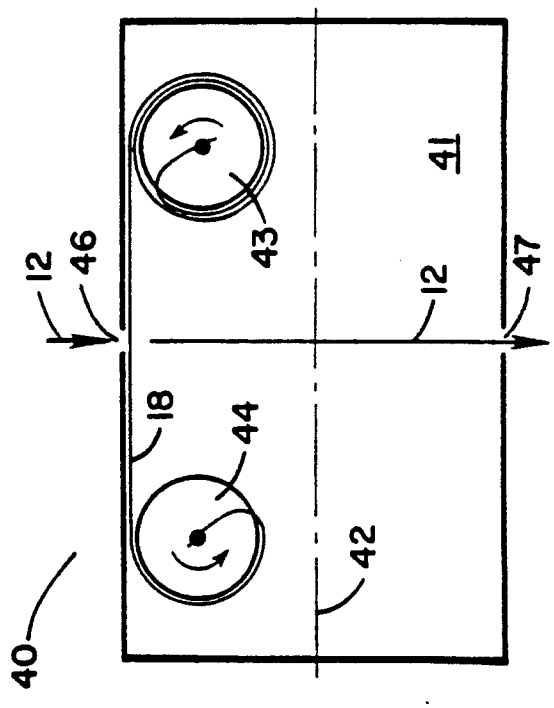
FIG. 6
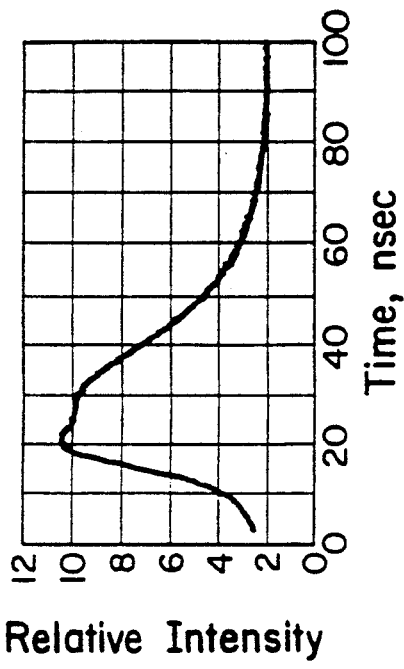
FIG. 4
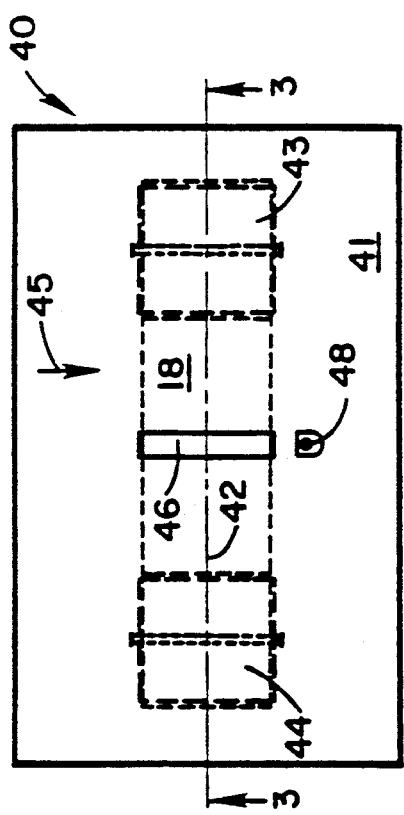
FIG. 2
FIG. 3

MATERIAL PROPERTIES

This application is a continuation of U.S. Pat. No. 07/463,577 filed Jan. 11, 1990, now abandoned.

FIELD

This invention relates to the use of radiation pulses, as from high power pulsed lasers, in the shock processing of solid materials. It has to do particularly with methods and apparatus for improving properties of solid materials by providing shock waves therein. The invention is especially useful for enhancing or creating desired physical properties such as hardness, strength fatigue strength, The invention comprises significant improvements in the methods and apparatus of U.S. Pat. No. 3,850,698, Nov. 26, 1974, of Philip J. Mallozzi and Barry P. Fairand for Altering Material Properties.

BACKGROUND

As the Mallozzi and Fairand patent points out, old methods for the shock processing of solid materials typically involve the use of high explosive materials in contact with the solid, or high explosive materials are used to accelerate a plate that strikes the solid to produce shock waves therein. Such methods have several disadvantages. For example: (a) it is difficult and costly to shock process non-planar surfaces and complicated geometries, (b) storage and handling of the high explosive materials pose a hazard, (c) the processes are difficult to automate and thus fail to meet some industrial needs, and (d) the high explosive materials cannot be used in extreme environments such as high temperatures and high vacuum.

Shot peening is another widely known and accepted process for improving the fatigue, hardness, and corrosion resistance properties of materials by impact treatment of their surfaces. In shot peening, many small shot or beads are thrown at high speed against the surface of a material. The shot or beads sometimes escape from the treatment equipment and scatter in the surrounding area. Since particles might get into surrounding machinery and cause damage, shot peening usually cannot be used in a manufacturing line. Ordinarily it cannot be used on machined surfaces without damaging them.

Laser shock processing equipment, however, can fit right into manufacturing lines without danger to surrounding equipment. It is also readily adaptable to automatic control, making it further attractive for production line applications. It can be used on machined surfaces of harder metals and alloys with no damage to the surfaces.

The interaction of a pulsed laser beam with the surface of a material gives rise to a pressure pulse (shock wave) that propagates into the material and changes its properties. In the case of metals, for example, the changes in properties are caused by the introduction of cold work that increases the hardness and strength of the material. By appropriate tailoring of the peak pressure and width of the shock wave, it is possible to enhance selected material properties, such as fatigue strength, and at the same time not adversely affect other properties, such as corrosion resistance. It is possible also to shock process a finished piece of material without disturbing its surface, where a thin sacrificial layer of overlay material has been attached intimately onto the surface of the workpiece.

Shock processing with coherent radiation has several advantages over what has been done before. For example: (a) The source of the radiation is highly controllable and reproducible. (b) The radiation is easily focused on preselected surface areas and the operating mode is easily changed. This allows flexibility in the desired shocking pressure and careful control over the workpiece area to be shocked. (c) Workpieces immersed in hostile environments such as high temperature and high vacuum can be shock processed. (d) It is easy to shock the workpiece repetitively. This is desirable where it is possible to enhance material properties in a stepwise fashion. Shocking the workpiece several times at low pressures can avoid gross deformation and spallation of the workpiece. (e) The process is readily amenable to automation. (f) Nonplanar workpieces can be shock processed without the need of elaborate and costly shock focusing schemes.

As mentioned in the patent of Mallozzi and Fairand, several publications have dealt with the use of lasers to provide stress waves in solids:

1. G. A. Askar'yan and E. M. Moroz, JETP Letters 16. 1638 (1963).
2. Frank Neuman, Appl. Phys. Letters 4, 167 (1964).
3. David W. Gregg and Scott J. Thomas. J. Appl. Phys. 37, 2787 (1966).
4. C. H. Skeen and C. M. York, Appl. Phys. Letters 12, 369 (1968).
5. N. C. Anderholm, Appl. Phys. Letters 16, 113 (1970).
6. S. A. Metz and F. A. Smidt, Jr., Appl. Phys. Letters 19, 207 (1971).
7. L. C. Yang and Vincent J. Menichelli, Appl. Phys. Letters 19, 473 (1971).

The majority of these older papers were concerned with the phenomenology of lasergenerated pressure pulses. Exceptions include an experiment where pressure pulses generated in very thin aluminum foils were used to detonate insensitive high explosives, and a study of vacancy production in thin vanadium and nickel foils, as reported in the last two papers listed above. The early studies did not look at the possible use of pulsed lasers to significantly alter in-depth material properties such as dislocation substructures. Because of its high controllability and reproducibility, a pulsed laser provides an important tool for studies of basic mechanisms of shock deformation of solids, as well as practical material shock processing applications.

The papers listed as numbers 6 and 7 above were cited in the examination of the patent of Mallozzi and Fairand. Also cited were the following United States Patents and other publications, which were considered to be of interest to show shock hardening of metals, producing vacancy sites in metals by laser bombardment, and the effects of laser bombardment on metals.

| UNITED STATES PATENTS | | | |
|---|---|---|---|
| 2,703,297 | 3/1955 | MacLeod | 148/4 |
| 3,172,199 | 3/1965 | Schmidt | 148/4 X |
| 3,218,199 | 11/1965 | Cowan et al | 148/4 |
| 3,454,435 | 7/1969 | Jacobs | 148/12.7 |

OTHER PUBLICATIONS

Soviet Physics-Doklady, Vol. 14, No. 11, May 1970, pgs. 1128-1130.

Soviet Physics-Technical Physics, Vol. 12, No. 6. Dec. 1967, pgs. 753-757.

Newer publications relevant to the field of the present invention include:

A. B. P. Fairand, B. A. Wilcox, W. J. Gallagher, and D. N. Williams, J. Appl. Phys., Vol. 43, pp. 3893–3895 (1972).

B. A. H. Clauer, B. P. Fairand, and B. A. Wilcox, Met. Trans. A., Vol. 8A, pp. 119–125 (1977).

C. A. H. Clauer, B. P. Fairand, and B. A. Wilcox, Met. Trans. A., Vol. 8A, pp. 1871–1876 (1977).

D. B. P. Fairand and A. H. Clauer, J. Appl. Phys., Vol. 50, pp. 1497–1502 (1979).

E. A. H. Clauer and B. P. Fairand, *Applications of Lasers in Materials Processing*, ed. by E. Metzbower, American Society for Metals, Metals Park, Ohio (1979).

F. A. H. Clauer, J. H. Holbrook, and B. P. Fairand, *Shock Waves and High Strain Rate Phenomena in Metals*, ed. by M. A. Meyers ard L. E. Murr, Plenum Press, New York (1981), pp. 675–702.

G. S. C. Ford, B. P. Fairand, A. H. Clauer, and R. D. Galliher, Investigation of Laser Shock Processing, Final Report, AFWAL-TR-80-3001, Vol. II (August, 1980).

H. A. H. Clauer, C. T. Walters, and S. C. Ford, The Effects of Laser Shock Processing on the Fatigue Properties of 2024-T3 Aluminum, *Lasers in Materials Processing*, Ed. by E. A. Metzbower, American Society for Metals, Metals Park, Ohio, 1983, pp. 7–22.

I. Ichiyama at al, U.S. Pat. No. 4,293,350, Oct. 6, 1981; Grain-oriented Electromagnetic Steel Sheet with Improved Watt Loss.

J. T. Iuchi, S. Yamaguchi, and T. Ichiyama, Laser processing for reducing core loss of grain oriented silicon steel, J. Appl Phys. 53(3), March 1982, pp. 2410–2412.

K. Jean Fournier, Remy Fabbro, J. L. Strudel, and D. Ayrault, Experimental Study of Deformation Induced in Metallic Alloy Laser Generated High Pressure Shocks, Conference: LAMP '87: Laser Advanced Materials Processing——Science and Applications, Osaka, Japan, 21–23 May 1987. High Temperature Society of Japan, c/o Welding Research Institute of Osaka University, 11-1 Mihogaoka, Ibaraki, Osaka 567, Japan, 1987, pp. 365–370.

L. R. Fabbro, J. Fournier, E. Fabre, E. Leberichel, Th. Hannau, C. Corbet, Experimental study of metallurgical evolutions in metallic alloys induced by laser generated high pressure shocks, Proceedings of SPIE - The International Society for Optical Engineering v 668. Publ. by SPIE, Bellingham, Wash., USA, 1986, pp. 320–324.

In recent years, research by Battelle Memorial Institute has looked into various potential uses for laser shock processing.

The tensile yield strength of welded 5086 and 6061 aluminum alloys was increased about 50 percent by laser shocking the weld and heat-affected zones by overlapping spots, as discussed in Reference C. The fatigue life of a welded 5456 aluminum alloy was substantially increased over the life of unshocked material. This alloy is used in welded form for structural components of high performance ships. Results of metal forming experiments showed that laser generated shocks can form the small and relatively thin metal parts such as those used in small machines and equipment components. Some success was achieved also in laser shocking of ceramics. For example, the hardness of silicon nitride, which is very hard in its untreated state, was increased by several percent.

Research discussed in the paper listed as item H above showed that:

The improvements in the fatigue life produced by laser shock processing are a result of the residual compressive stresses developed in the irradiated surfaces slowing the crack propagation rate. Changes in the shape of the crack front and slowing of the crack growth rate when the crack front encounters the laser shocked zone in a laser shock processing condition show this to be the case.

Compressive residual stresses initially produced below the irradiated surface can be modified or eliminated by the passage of a tensile stress wave reflected from the opposite surface of the part. If one-side-only shocking is used, it is necessary to either process thicker specimens to decrease the intensity of the reflected wave, use specimens with an irregular back surface to diffuse the reflected wave, or use a momentum trap to carry away the reflected shock wave.

Laser shock processing is an effective method of increasing fatigue life in aluminum by treating fatigue critical regions. As to what effect the tensile residual stresses surrounding the laser shocked region would have on crack initiation, a previous study (described in F above) of the effect of laser shock processing on fatigue of welded aluminum specimens had used a series of overlapping spots to cover the weld and heat-affected zones. Significant increases in fatigue life were observed for these specimens indicating that overlapping the spots did not significantly reduce the effects of laser shocking. This is supported by results on a low carbon steel that showed no change in the compressive residual stress profile across the edge of a spot in a spot-overlap region.

A typical method according to the present invention for improving properties of a solid material by providing shock waves therein, comprises directing to the surface of the material a plurality of pulses of coherent radiation having average energy fluence of at least about 10 Joules per square centimeter and rise time of not longer than about 5 nanoseconds within a fluorescence envelope lasting about 0.5 to 5 milliseconds, at a rate of about one radiation pulse per 100 to 200 microseconds.

Typically the leading edge of each radiation pulse is sharpened by providing in the path of the pulse a metallic film about 150 to 5000 angstroms thick that is vaporized by the pulse, and the metallic film is moved across the path of the radiation pulses so that a later pulse strikes an area of the film not already vaporized by an earlier pulse.

The metallic film typically comprises a coating of aluminum on a supporting film that is substantially transparent and nondistorting to the radiation wavefront. Typically the supporting film comprises a strong polyester material, such as oriented, at least partially crystalline, polyethylene terephthalate, and is not thicker than about 10 wavelengths of the radiation. Typically a radiation pulse vaporizes an area of the metallic film of about 0.1 to 0.2 square millimeters in about 0.1 to 3 nanoseconds, after which the area of vaporization may expand to about 1 to 1000 square millimeters in about 2 to 10 nanoseconds. The radiation typically comprises a beam about 0.1 to 1000 square millimeters in cross-section.

The solid material typically is metallic.

Typical apparatus according to the invention for improving properties of a solid material by providing shock waves therein, comprises means for providing, and means for directing to the surface of the material, a plurality of pulses of coherent radiation having average energy fluence of at least about 10 Joules per square centimeter and rise time of not longer than about 5 nanoseconds within a fluorescence envelope lasting about 0.5 to 5 milliseconds,at a rate of about one radiation pulse per 100 to 200 microseconds.

The pulse providing means typically comprises laser oscillator means and laser amplifying means.

Typically the amplifying means comprises an amplifier rod consisting essentially of strengthened phosphate laser glass. The amplifier rod typically comprises glass that was strengthened by an ion exchange process and is capable of withstanding at least about five times the power per unit length of amplifier rod that typical unstrengthened phosphate glass is capable of withstanding. This enables a higher pulse rate. Especially suitable material for the amplifier rod comprises Kigre Q-89 strengthened phosphate glass or a substantial equivalent thereof. cl DRAWINGS FIG. 1 is a schematic view illustrating typical embodiments of the present invention.

FIG. 2 is a schematic plan view of typical apparatus for providing rapid movement of a metallic film as required in some embodiments of the present invention.

FIG. 3 is a schematic sectional view taken in the plane 3—3 of FIG. 2.

FIG. 4 is a schematic end view of typical apparatus as in FIGS. 2 and 3.

FIG. 5 is an oscilloscope trace showing the average relative intensity against time of a typical pulse of radiation for providing shock waves according to the invention.

FIG. 6 is a schematic plan view of a region on the surface of a target that was shock treated according to the invention, showing the areas to which radiation was directed and the locations at which residual stress was measured in Example B herein.

CARRYING OUT THE INVENTION

Figure 1:
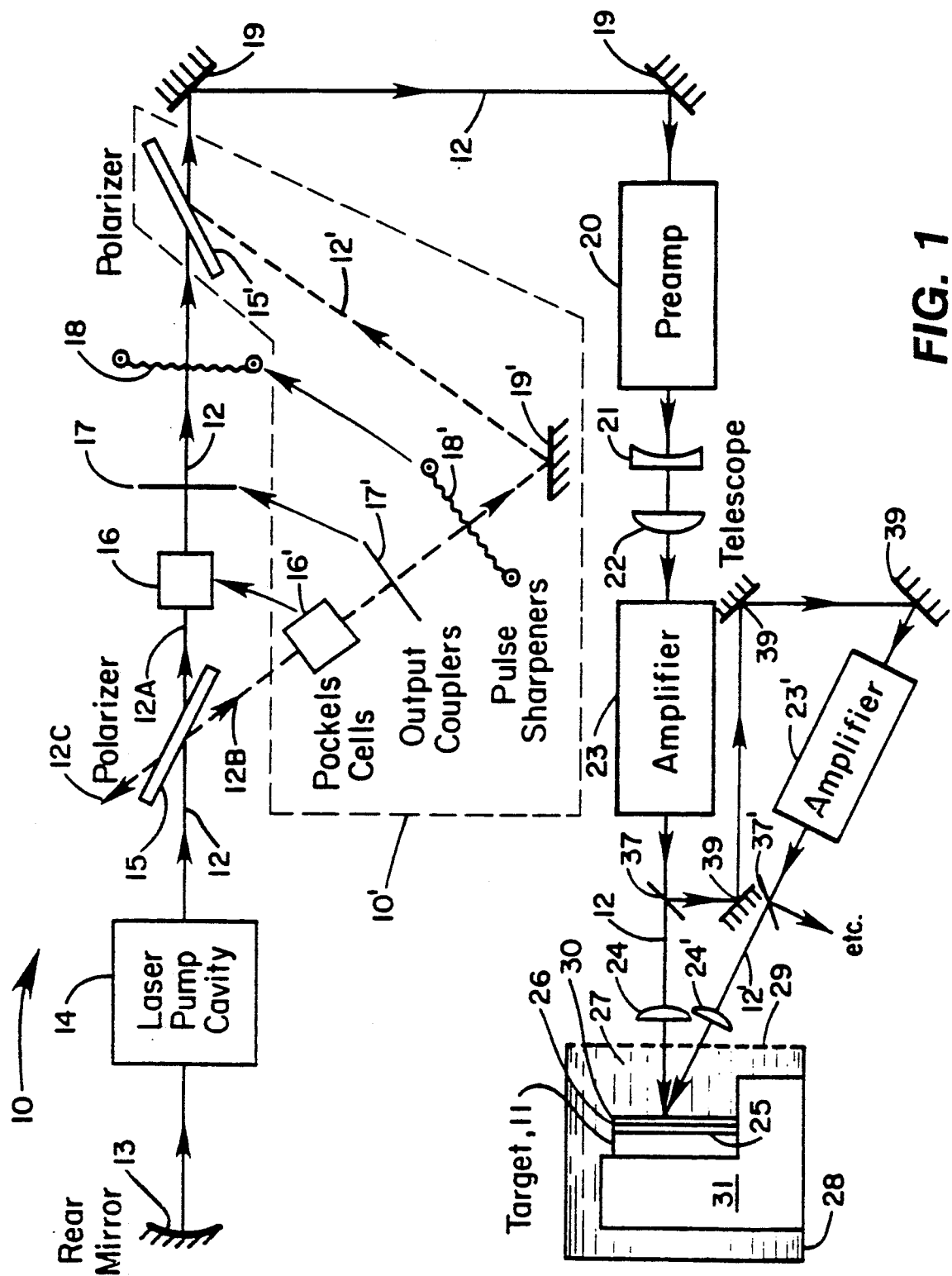

Referring now to FIG. 1, typical apparatus 10 is shown. suitable for practicing the present invention for improving properties of a metallic material in a target 11 by providing shock waves therein, and wherein there are directed to the surface of the material 11 a plurality of pulses of coherent radiation 12 having average energy fluence of at least about 10 Joules per square centimeter and rise time of not longer than about 5 nanoseconds within a fluorescence envelope lasting about 0.5 to 5 milliseconds, at a rate of about 1 radiation pulse per 100 to 200 microseconds.

In apparatus 10 for practicing the present invention, the components 15'-19' shown inside the dashed polygon 10' are optional. Embodiments that do not include these components will be described first.

Multiple Pulses, Fast Film Movement

The coherent radiation 12 is generated by an oscillator 13-17 comprising a rear mirror 13, a laser pump cavity 14, a polarizer 15, a pockels cell 16, and an output coupler 17. The laser pump cavity 14 comprises a gain medium, such as a neodymium-glass laser rod, pumped by flashlamps that are driven at regular intervals of about 0.5 to 10 seconds by a pulse forming network (PFN). One such laser pump cavity 14 that has been used conveniently in the apparatus 10 comprises the following components manufactured by Kigre, Inc. of Hilton Head, S.C.

FC-500/2 Laser Cavity, 8" arc length
⅜ by 7.5" Q-98 Laser rod, 3% doping level, ends 1 degree opposed, antireflection coated at both ends.
Two Fluid-cooled Flashlamps
Model 883 Coniroller with integral 330 watt Power Supply.
Closed Cycle Cooling System The oscillator 13-17 provides an approximately rectangular fluorescence envelope lasting about 0.5 to 5 milliseconds. The coherent radiation 12 from the laser pump cavity 14 is linearly polarized. The polarizer 15 breaks the radiation 12 down into two linearly polarized orthogonal components; one of which (component B) it reflects away as indicated at 12B; and the other (component A) it transmits on, as indicated at 12A, to the pockels cell 16.

With a proper potential present across it (about 3,300 volts for a cell of transverse deuterated potassium dihydrogen phosphate), the pockels cell 16 retards the coherent radiation 12A one-fourth wavelength (90 degrees) while transmitting it on to the output coupler 17, which reflects about one-half of it back toward the polarizer 15. The reflected energy proceeds back through the pockels cell 16 with a further retardation of one-fourth wavelength (90 degrees). So the back radiation is one-half wavelength (180 degrees) out of phase with the forward radiation of component A, thus having the opposite polarization (B), and it is reflected away by the polarizer 15, as indicated at 12 C, so as not to return to the laser pump cavity 14. Thus, laser energy builds up and is stored in the laser rod of the pump cavity 14, because oscillations cannot occur.

After at least about 100 microseconds, the potential across the pockels cell 16 is reduced to zero, typically by shorting it to ground, for about 1 to 5 microseconds; and the shorting of the pockels cell 16 s repeated at intervals of about 100 to 200 microseconds thereafter. While it is shorted, the pockels cell 16 does not retard the radiation 12, and the oscillator 13-17 produces about 2 to 50 laser pulses 12 in each fluorescence envelope, with sufficient time between pulses for stored energy to build up in the laser rod, while keeping fluorescent losses to a minimum.

The output coupler 17 comprises a partially reflective mirror that transmits about half of the energy in each pulse 12 on to the pulse sharpener 18 comprising a coating of aluminum about 150 to 5,000 angstroms thick on a supporting film that is substantially transparent and thin enough to be non-distorting to the radiation wavefront. The supporting film typically comprises a strong polyester material such as oriented, at least partially crystalline, polyethylene terephthalate, about 1 to 40 micrometers thick. One such material that we have used is Mylar, a product of E. I. du Pont de Nemours & Company. Mylar is birefringent, and its optical axis should be oriented to correspond with the polarization of the polarizers 15 and 15'.

The radiation pulse 12 strikes the aluminum film 18, typically vaporizing an area of about 0.1 to 0.2 square millimeters of the film in about 0.1 to 3 nanoseconds, after which the area of vaporization typically expands to about 1 to 1,000 square millimeters in about 2 to 10 nanoseconds. This sharpens the leading edge of the radiation pulse 12 passing through the hole where the film 18 has been vaporized away, and the modified pulse 12 is directed to a preamplifier 20. Where necessary or convenient, planar mirrors 19 may be included in the path of the radiation 12 to change or adjust the direction of the beam of radiation 12.

The preamplifier 20, which may be (and typically is) similar to the laser pump cavity 14, amplifies the radiation pulse 12, typically by about 3 to 10 decibels, and the amplified radiation 12 proceeds by way of a telescope, typically comprising a negative lens 21 and a positive lens 22, to an amplifier 23, which typically further amplifies the radiation pulse 12 by about 5 to 15 decibels. One amplifier 23 that has been used conveniently in the apparatus 10 comprises the following components manufactured by Kigre, Inc. of Hilton Head, S.C.

Power Amplifier Assembly, FA-1000/2
27 mm dia. × 310 mm long Q-89 Laser Rod (described hereinafter)
Two Fluid-cooled Lamps, 63 cm arc length
Model 886-2 Power Supply compatible with 883 Controller
Dual PFN assemblies
Coolant-to-water Cooling System The amplified radiation pulse 12 is focussed by a positive lens 24 onto a desired area of the surface 25 of the target 11, to provide an average energy fluence therein typically of at least about 10 (and preferably about 10 to 500) Joules per square centimeter, and an average power flux on the target of at least about $10^7$ (and preferably about $10^9$ to $10^{11}$) watts per square centimeter, with pulse lengths typically of about 10 to 1,000 nanoseconds. The maximum power flux will be limited by the formation of a reflecting plasma at the target surface. This maximum power flux will increase as the laser wavelength decreases. For example for a laser wavelength of 0.53 micrometer the maximum power flux will be approximately four times that for a wavelength of 1.06 micrometers.

A portion of the output 12 of the amplifier 23, typically about 10 percent, may be directed by a beam splitter 37 and mirrors 39 to a second similar amplifier 23' to provide a second amplified radiation pulse 12' focused by a positive lens 24' onto a desired area of the surface 25 of the target 11 simultaneously with the pulse 12 from the amplifier 23. In the same way, a portion of the output 12' from the amplifier 23' may be directed by a beam splitter 37' etc, and any convenient number of amplifiers may be employed similarly to provide additional pulses to the target 11. Typically pulses from the different amplifiers are directed to the same area on the surface 25 of the target 11, to overlapping areas on the surface of the target 11, and/or to areas that are on opposite surfaces of the target 11.

The aluminum foil 18 blocks the path of the radiation beam 12 briefly, but is rapidly vaporized by the radiation beam 12, first in a minute region, then rapidly spreading outward from this region until the foil is vaporized over the entire area in the path of the beam. This action provides an extremely sharp leading edge in each radiation pulse 12. Thus, the switching by the foil 18 is spatially transverse. An individual area of the foil 18 switches from reflecting to transmitting in the time required for the foil vapor expand to about three times its original volume. At the boiling point of aluminum, 2057 Celsius, the vapor expands at a velocity of about 1200 meters per second. For a typical commercially available film comprising a layer of aluminum approximately 300 angstroms thick on a Mylar supporting film about 10 micrometers thick, the irradiated aluminum triples its volume in about 48 picoseconds. Thus, the switching time at any given point within the irradiated area is about 100 times faster than the time of switching averaged over the entire area.

In FIG. 5, which shows an oscilloscope trace of average relative intensity for a typical radiation pulse 12 applied to the target 11, the rise time of the pulse 12 (about 20 nanoseconds) is the time taken by the vaporized area of the aluminum film 18 to expand to the full area of the laser beam 12. The actual time for a small area of the foil to switch from reflecting to transmitting is about a factor of 100 shorter (about 0.2 nanosecond).

Relevant phenomena are described in a conference paper of the Society of Photo-optical Instrumentation Engineers of August 1976 (M, below). The abstract states: The opening time was measured of the so called "blast shutter", presently used as an isolator in high power laser systems. The shutter consists of a 275 angstrom thick aluminum film deposited on a transparent plastic film 12 micrometers thick. The aluminum film is suddenly removed by exposing it to high power pulses from a neodymium:glass laser ($\lambda$ = 1.06 millimeters). Pulses of 50 picoseconds in duration were used that delivered between 0.5 and 3 joules per square centimeter of energy onto the aluminum film. The absorbed energy superheats the film and turns it into a rapidly expanding cloud of aluminum vapor. A blue laser beam from a continuous wave argon laser passes through the shutter and is detected by an ultrafast streak camera, set for 50 picosecond resolution. With this arrangement 10 to 90 percent shutter opening times varying from 0.8 to 4 nanoseconds have been measured, the former occurring at laser pulse energy densities of 2 joules per square centimeter.

M. M. A. Duguay, M. A. Palmer, and R. E. Palmer, Laser Driven Subnanosecond Blast Shutter, Proc. SPIE, Vol. 94, High Speed Optical Techniques, pp. 2-6.

The isolator referred to in the abstract quoted above is described in a United States Patent of 1977 (N. below). Typically, the foil used therein comprises essentially aluminum, gold, silver, platinum, copper, or lead, about 100 to 1000 angstroms thick; typically comprising a coating on a transparent support that comprises essentially glass, quartz, polyethylene terephthalate, or other transparent plastic, and that preferably is less than about 10 wavelengths thick. These materials, and other materials appropriately adapted, may be used in the pulse sharpeners 18, 18' of the present invention.

N. Mallozzi et al, U.S. Pat. No. 4,002,403, Jan. 11, 1977; Suppressing Superradiance.

Any metal film that allows essentially no laser light transmission through a few hundred Angstrom film thickness is usable as a pulse sharpening foil. The main advantage of using aluminum is that thin plastic film coated with a few hundred Angstroms of aluminum is readily available and is inexpensive. It is used extensively in greeting cards. In addition the surface of the aluminum is not adversely affected if oxidation occurs. The surface of copper and silver films are deleteriously affected by oxidation. The film of aluminum on plastic used in reference M, above, is the same as the film used in reference N, above, and in the examples of the present invention.

Of course the film 18 must be moved rapidly to provide a different region of the film, not already vaporized, in the path of the radiation 12 before the next pulse is generated. A typical beam 12 from the oscillator 13-17 has a diameter of about 1 centimeter, so the aluminum film 18 must be moved across the path of the beam 12 at a speed of about 50 to 100 meters per second to move the vaporized area out of the path of the beam in about 100 to 200 microseconds. However, the beam can conveniently be focussed to a diameter of about 0.3 centimeter before it impinges on the aluminum film 18, reducing the required speed to about 15 to 30 meters per second. Further concentration of the beam 12 might not be desirable, because the power flux density might then exceed the threshold above which an aluminum plasma is formed that would itself block the laser beam 12. This can be avoided by reducing the output power from the oscillator 13-17 and increasing the gain of the preamplifier 20 enough to provide the required power input level to the final amplifier 23.

FIGS. 2, 3, and 4 illustrate schematically a suitable device for moving the film 18 at the required speed. A cylindrical drum 41 rotates about its axis 42 at a speed high enough to provide the required rate of movement in the film 18 mounted just inside the periphery of the drum 41, between a supply spool 43 and a drive spool 44. During part of each revolution of the drum 41, as indicated by the arrow 45, the slots 46, 47 at opposite sides of the drum 41 cross the path of the radiation pulses 12; so that several pulses 12 in succession proceed in through the entry slot 46, strike the aluminum film 18, vaporizing it, and continue out from the exit slot 47 and on to the mirrors 19, etc, as shown in FIG. 1.

At the appropriate time, just before the slots 46, 47 begin to cross the path of the laser radiation 12, any suitable actuating device (not shown) is triggered by an actuating component 48 mounted on the drum 41. For example, the triggering component 48 may comprise a mirror that reflects a beam of light to a photodetector to provide a timing pulse that fires the flashlamps in the laser pump cavity 14 when the slots 46, 47 begin to cross the path of the laser beam 12. Then several laser pulses 12 in succession strike the aluminum film 18, each in a different area of the film 18, and proceed as described above in connection with FIG. 1.

The process is repeated periodically, typically about every 0.5 to 10 seconds, with the actuating device automatically turned off in the interim. Meanwhile the film 18 is advanced by the drive spool 44 to move a new region of the film 18 in line with the entry slot 46. Alternatively, the film 18 can be advanced continuously at a slower rate by the drive spool 44 to provide a different portion of the film's surface for each series of pulses 12. Typically a roll of aluminized Mylar film approximately 6 inches wide and 1000 feet long can provide the pulse sharpening for about 100,000 to 1,000,000 laser pulses 12.

Two Pulses, Slow Film Movement

Other typical embodiments of the present invention, which do not require special fast means for moving the film, also are illustrated in FIG. 1. In such embodiments the components enclosed within the dashed polygon 10' are included in the apparatus 10.

The portion of the apparatus 10 already described above provides one properly sharpened pulse in the same manner as is described above. However the pockels cell 16 is shorted only once, typically about 200 microseconds after the firing of the flash lamps in the laser pump cavity 14; so only one pulse 12 of coherent radiation of component A is provided to the target 11 within each fluorescence envelope. Also the pulse 12 proceeds from the pulse sharpener 18 through a second polarizer 15' before being directed to the preamplifier 20 by the mirrors 19.

The laser pump cavity 14, the polarizer 15, the pockels cell 16', and the output coupler 17' form a second oscillator 14-17' by means of which the other radiation component 12B provides a single sharpened pulse 12' by way of the pulse sharpener 18'. the mirror 19' and the polarizer 15', which reflects the component B radiation to the first mirror 19; and from there the path of the radiation 12 is the same as that of the component 12A.

The operation of the second oscillator 13, 14, 15, 16', 17' is similar to that of the first oscillator 13-17. The second oscillator 13-17' also provides an approximately rectangular fluorescence envelope lasting about 0.5 to 5 milliseconds, and the coherent radiation 12 from the laser pump cavity 14 is linearly polarized. The polarizer 15 breaks the radiation 12 down into two linearly polarized orthogonal components; one of which (component B) it reflects, as indicated at 12B, to the pockels cell 16'. The other (component A) it transmits on, as indicated at 12A, to the pockels cell 16.

With a proper potential present across it (about 3,300 volts for a cell of transverse deuterated potassium dihydrogen phosphate), the pockels cell 16' retards the coherent radiation 12B one-fourth wavelength (90 degrees) while transmitting it on to the output coupler 17', which reflects about one-half of it back toward the polarizer 15. The reflected energy proceeds back through the pockels cell 16' with a further retardation of one-fourth wavelength (90 degrees). So the back radiation is one-half wavelength (180 degrees) out of phase with the forward radiation of component B, thus having the opposite polarization (A), and it is transmitted away through the polarizer 15, as indicated at 12 C, so as not to return to the laser pump cavity 14. Thus, there can be no oscillation and laser energy builds up and is stored in the laser rod of the pump cavity 14.

At the desired predetermined instant, the potential across the pockels cell 16' is reduced to zero, typically by shorting it to ground, for about 1 to 5 microseconds. While it is shorted, the pockels cell 16' does not retard the radiation 12B, and the oscillator 13-17' produces a second laser pulse 12' in each fluorescence envelope.

Typically the pockels cell 16' is shorted about 150 microseconds later than is the pockels cell 16, so that the second radiation pulse 12 will strike the target 11 about 150 microseconds after the first pulse 12. The polarizer 15', the pockels cell 16', the output coupler 17', the pulse sharpener 18', and the mirror 19' typically are substantially identical to the correspondingly numbered items 15-19, respectively.

Thus the apparatus 10 including the components enclosed within the dashed polygon 10' provides two radiation pulses 12 to the target 11 for each fluorescent envelope.

The process is repeated periodically, typically about every 0.5 to 10 seconds. To provide a different portion of their surfaces across the path of each pulse of radiation 12, the films 18, 18' need to move only about 1 centimeter per second. Movement at such a speed can be provided easily by any suitable conventional or special means. The movement may be either continuous or intermittent.

As described above, there is no oscillation (and laser energy builds up and is stored in the laser rod of the pump cavity 14) throughout each fluorescence envelope, except while one or the other pockels cell 16 or 16' is shorted; because all of the back radiation is directed away from the pump cavity 14 by the polarizer 15' in the direction 12C. The back radiation through the pockels cell 16 is reflected by the polarizer 15 along the path 12C, and the back radiation through the pockels cell 16' is transmitted through the polarizer 15 along the path 12C.

Except during the pulses of oscillation, the radiation that passes through the output couplers 17,17' to their respective pulse sharpeners 18,18' is far too weak to vaporize the metal foil, and it remains intact.

High Efficiency

In shock treatment according to the present invention, each individual pulse of radiation must have enough energy to exceed a particular threshold so as to produce the shock waves, and the rate at which the sold material can be treated is approximately proportional to the average power of the radiation pulses. For high efficiency and optimum results, the laser and associated apparatus that provide the coherent radiation to the solid material should produce a high ratio of output energy to heat in the laser medium. This ratio depends on the extraction efficiency of the stored energy and on the fraction of energy stored at the time of Q-switching by the pockels cell. The extraction efficiency, in the region of interest, is a monotonically increasing function of the ratio of the output fluence to the saturation parameter, S.

$$S = \frac{h\nu}{\sigma_L}$$

where $h\nu$ is the laser photon energy and $\sigma_L$ is the cross section of the stimulated emission. Since the output fluence in a single pulse is limited by the damage threshold of the laser glass, the energy extraction in a single pulse is limited. For 8 Joules per square centimeter output fluence, the efficiency has been calculated to be about 40 percent for a typical phosphate glass. However, this limitation on extraction efficiency can be circumvented by providing two or more laser pulses within a single fluorescence pulse envelope.

The efficiency can be improved by making the pumping pulse width short compared to the fluorescence lifetime. However, this requires such a high power loading in the flash lamps that the resulting spectrum is too far into the ultraviolet region to pump the laser efficiently, and the lamp lifetime is greatly shortened. It is preferable to circumvent the efficiency loss due to incomplete storage of energy at the time of Q-switching by extracting more than one Q-switched pulse from a single fluorescence envelope. Typically about half of the total energy pumped into the upper laser level is stored at the time of Q-switching. The remainder of the energy is either pumped into the upper laser level after Q-switching or is lost by fluorescent decay before Q-switching. Thus, multiple pulses under a single fluorescence envelope, where the time between pulses is about 100 to 200 microseconds, can produce a substantial improvement in efficiency. Typically the efficiency of the system can be increased from about 2 percent with a single pulse to about 6 percent with a plurality of pulses.

Amplifier Materials

As mentioned above, the rate at which metallic material can be treated according to the present invention is approximately proportional to the average power of the radiation pulses that produce the shock waves, provided each individual pulse has enough energy to exceed a particular threshold. We have found that the rate of production according to the invention can be increased approximately five fold by using a recently developed type of strengthened phosphate laser glass in the amplifier 23 that delivers the radiation pulses to the target 11.

At first blush, it may seem obvious to use strengthened glass in this manner. However, strengthened laser glasses have been available for more than a decade without finding widespread use in laser systems requiring high average power. In most laser applications the brightness and coherence of the laser beam are of prime importance, and both of them degrade at high average power to the extent that the laser beam is useless for such applications even before the fracture stress is reached for ordinary unstrengthened glass. Moreover, the silicate glasses that have been available in strengthened form for many years have such high temperature coefficients of index of refraction and such high stress coefficients of index of refraction that the strengthened glasses produce no more average power than do the unstrengthened glasses. Also the coefficient of gain in silicate glass is only about two-thirds that of phosphate glass, making it unsuitable for applications requiring high power.

Heretofore, the main reason for using strengthened glass has been that it is less likely to break during shipping or other handling. The greatly increased rates of production obtainable by using a strengthened phosphate glass amplifier in shock processing according to the present invention were unexpected and far from obvious.

Ion-exchange-strengthened phosphate glass became available around 1985. It has an average power capability about five times as great as that of the older phosphate glass. The temperature coefficient of index of refraction tends to cancel the density coefficient and the resultant change in index of refraction with temperature is much lower than for silicate glasses, so it is possible to obtain higher output power, approximately proportional to the greater strength of the glass. Because of the special glass composition that is required for the strengthening, however, the efficiency of the strengthened glass is only about 75 percent of the efficiency of the equivalent unstrengthened glass. It is only because the present shock treatment does not require a radiation beam of high brightness, and because the mixed polarization resulting from stress birefringence does not have any adverse affect, that the strengthened phosphate glass can provide significant improvements in average power such as to yield much higher rates of production in the shock process of the present invention.

A laser glass that has been used to advantage in practicing the present invention is Kigre Q-89 strengthened phosphate laser glass. Q-89 is a strengthened phosphate laser glass that combines the high gain and high damage-threshold properties of the phosphate glasses with the high strength and durability characteristics of the silicate glasses. Extensive research efforts of Kigre, Inc. in conjunction with the University of Rochester have resulted in the development of a laser glass composition combined with an ion-exchange process that results in an increase in rupture strength by factors of 5 and 6 over conventional phosphate glasses. The end result is a new laser material which promises to provide a break-through in the capability of laser glass to provide high average power.

The manufacturer, Kigre, Inc. of Hilton Head, S.C., lists the following properties of Q-89.

| Spectroscopic Properties | |
| --- | --- |
| Peak Wavelength (nm) | 1054 |
| Cross Section ($\times 10^{-20}$ cm$^2$) | 3.8 |
| Fluorescent Lifetime (usec) | 350 |
| Radiative Lifetime (usec) | 308 |
| Linewidth (nm) FWH | 21.2 |
| Loss @ Lasing Wavelength ($\% \cdot$ cm$^{-1}$) | 0.08 |
| Optical Properties | |
| Index of Refraction (Nd) | 1.559 |
| Abbe. No. | 63.6 |
| Thermal Properties | |
| Transformation Point °C. | 495 |
| Thermal Expansion ($10^{-7}$/°C.) (20°-40° C.) | 99 |
| Thermal Conductivity (W/m · K) | 0.82 |
| Physical Properties | |
| Density (gm/cc) | 3.14 |
| Solarization Resistance | Excellent |

Further information about Q-89 glass is brought out in a paper published in 1988 (0, below). The abstract states: Ion-exchange strengthened phosphate glass in an active-mirror geometry remained unfractured at pump power levels 3 times the average pump fracture limit of unstrengthened phosphate glass in the same geometry. In addition, pretreatment and posttreatment measurements of surface wavefront and roughness were made on a set of rectangular substrates to quantify any ion-exchange-induced surface modifications. Experimental measurements of treatment-induced wavefront deformation of strengthened blocks were shown to be less than modeled values of distortion attributable to extended treatment times.

O. K. A. Cerqua, M. J. Shoup III, D. L. Smith, S. D. Jacobs, and J. H. Kelly, Strengthened phosphate glass in a high rep rate active-mirror amplifier geometry, Applied Optics, Vol. 27, No. 12, Jun. 15, 1988, pp. 2567-2572.

The solid target 11 typically comprises at least one metal, alloy, intermetallic compound, or other metallic material. Some typical target materials for which the present invention is especially useful are silver, copper, magnesium, aluminum, cadmium, zinc, iron, nickel, and titanium.

Typically a layer 26 of solid or liquid overlay material is attached to a surface 25 of the target 11, and the radiation pulse 12 is directed to the layer 26 of overlay material. The thickness of the target 11 plus any overlay 26 that is absorbent to the radiation 12 preferably is at least about two micrometers greater than the mean free path of the radiation 12 therein. The target 11 preferably is mounted against a substantially larger solid support member 31 or is rigidly held by a fixture, either of which is rigidly attached to a table or other large fixed object.

Overlays may be applied over the surface of the target 11 being treated. These overlay materials may be of two types, one transparent to the laser radiation and one opaque to the laser radiation. They may be used either alone or in combination with each other; but it is preferred that they be used in combination, with the overlay 26 directly on the surface 25 of the target 11 being opaque and the outer overlay 30 or 27 being transparent.

The layer of overlay material 26 should be attached securely over the surface 25 of the target 11 so as to be in intimate surface contact throughout the area to be radiated. Where some or all of the overlay material comprises a liquid, as at 27, it may be held within an enclosure 28, of which at least the front portion 29 preferably is transparent to the radiation 12, or it may flow over the area to be treated without restriction by an enclosure. Where a liquid transparent overlay 27 is used, the solid transparent overlay 30 may be omitted, if desired. Where only the solid transparent overlay 30 is desired, the liquid 27 and the enclosure 28 may be omitted.

The transparent overlay material should be substantially transparent to the radiation. Useful transparent overlay materials include water, water-based solutions, other noncorrosive liquids; glass, quartz, sodium silicate, fused silica, potassium chloride, sodium chloride, polyethylene, fluoroplastics, nitrocellulose, and mixtures thereof. Fluoroplastics, as they are known by the ASTM nomenclature, are paraffinic hydrocarbon polymers in which all or part of each hydrogen atom has been replaced with a fluorine atom. Another halogen, chlorine, can also be part of the structure of a fluoroplastic. By order of decreasing fluorine substitution and increasing processability, these materials include polytetrafluoroethylene (TFE); fluorinated ethylenepropylene (FEP): the chlorotrifluoroethylenes (CTFE); and polyvinylidine fluoride (PVF$_2$). Also available is a variety of copolymers of both halogenated and fluorinated hydrocarbons, including fluorinated elastomers.

Where desired, the opaque overlay material may be substantially opaque to the radiation. Useful opaque overlay materials include black paint, pentaerythritol tetranitrate (PETN); bismuth, lead, cadmium, tin, zinc, graphite; and mixtures of charcoal with various transparent materials such as mixtures of nitrocellulose and potassium perchlorate or potassium nitrate. Optionally, a layer of another solid overlay material 30 may be attached to the layer of substantially opaque material 26. The outer solid layer 30 may be either transparent or opaque.

Where a substantially inert overlay material is used, it preferably has an acoustic impedance of at least about that of the target and a specific sublimation energy of less than about $5 \times 10^{10}$ ergs per gram. Acoustic impedance is defined as the product of sound velocity in the material times its density. Specific sublimation energy means the energy required per unit mass to transform a material from a solid form to a gaseous form. Metals having sublimation energies in the preferred low range include bismuth, lead, cadmium, tin, and zinc.

The overlay material may be exothermic (i.e., a material that releases energy), and preferably has the property of rapidly releasing chemical energy, either by detonation or by deflagration, in response to the radiation. Detonation is a process by which a high explosive undergoes chemical reaction within a specific type of shock wave called a detonation wave whose velocity is nearly constant for a given type of high explosive. Deflagration is a process by which a material burns and releases chemical energy.

The following Table 1 lists most of the more important chemicals used in the American explosive industry. Various ingredients listed in the table can be combined in many ways to provide a range of characteristics in overlays for various needs.

TABLE 1
COMMON EXPLOSIVES AND INGREDIENTS USED IN U. S. EXPLOSIVES INDUSTRY

| Primary High Explosives | |
|---|---|
| Mercury fulminate | Lead azide |
| Diazodinitrophenol | Lead styphnate |
| Nitromannite | |

| Secondary High Explosives | |
|---|---|
| TNT (trinitrotoluene) | Tetryl (trinitrophenyl-methylnitramine) |
| RDX (cyclotrimethyl-enetrinitramine) | NG (nitroglycerine) |
| PETN (pentaerythritol tetranitrate) | AN (ammonium nitrate) |
| | Nitrostarch |
| Ammonium picrate | Picric acid |
| DNT (dinitrotoluene) | EDNA (ethylenedia-minedinitrate) |

| Low Explosives | |
|---|---|
| Black powder (potassium nitrate, sulfur, charcoal) | Smokeless powder |
| | Nitrocotton |
| Black powder (sodium nitrate, sulfur, charcoal) | |

| Nonexplosive Ingredients | |
|---|---|
| Aluminum | Waxes |
| Diphenylamine | Metal nitrates |
| Mononitrotoluene | Metals (aluminum, ferrosilicon) |
| Wood pulps, meals, other combustibles | |
| | Paraffin, other hydrocarbons |
| | Chalk, diphenylamine, wax, sulfur, carbon |

In typical useful embodiments of the invention, the target may be either substantially opaque or transparent to the laser radiation, the overlay material is substantially opaque, has low sublimation energy, and is substantially inert. A layer of another overlay material, having low thermal diffusivity and substantially transparent to the radiation, may be attached to the layer of opaque overlay material on the target. The outer layer may be substantially inert, or it may be exothermic.

In other typical useful embodiments of the invention, the target may be either substantially opaque or transparent to the laser radiation, the overlay material is substantially opaque and exothermic.

In still other typical useful embodiments of the invention, the target is substantially opaque to the radiation, and the overlay material is substantially transparent to the radiation and has low thermal diffusivity. The overlay material may be substantially inert, or it may be exothermic.

A typical overlay is about 10 to 20,000 micrometers thick.

In those typical embodiments where the overlay material is substantially transparent to the radiation and the radiation comes in pulses at 100 to 200 microsecond intervals, the overlay material, having been destroyed by the first pulse, must rapidly be replaced between pulses with new overlay material in intimate contact with the target surface. This is best done with a high-speed pulsed or continuous liquid jet of the overlay material directed at the irradiance area in a configuration such that the liquid overlay layer is reestablished prior to each succeeding pulse. The flow velocity must be at least equal to the narrowest dimension of the irradiance area divided by the interpulse time interval.

In the embodiment where the plurality of pulses do not come from the same output coupler 17, but one pulse comes from the output coupler 17 and one pulse comes from the output coupler 17', two methods may be used to employ the pulses without high speed replacement of the overlay material. In the first method, the mirror 19', the polarizer 15', or both, are tilted slightly so that the two pulses do not traverse the optical system along the same path and therefore impinge the target surface at two different irradiance areas, each having a fully constituted overlay obtained by standard means. In the second method, the two pulses travel the same path through the laser system and are separated thereafter at a beamsplitter by taking advantage of the fact that they each have a separate orthogonal linear polarization state. In this case, each of the two separate radiation beams is brought to the target by a separate lens system.

Preliminary results indicate that the present process can be useful with non-metals such as ceramics and polymers as well as with metals. The development of the laser-induced stress wave and use of the overlays can be approximately the same irrespective of the target material. The stress wave can pass into the target material and modify its properties in a similar manner whether it is metallic or non-metallic.

EXAMPLES

In each of the following examples, unless otherwise indicated, laser shock hardening of a material according to the present invention was performed as described below, using apparatus as shown in FIG. 1 without the components inside the dashed polygon 10'. The principle components were a Kigre oscillator 14, preamplifier 20, and two beam amplifiers 23 as described above. The outputs from the amplifiers 23 were directed to a common spot at a given location on the target 11.

Each spot was approximately 12 millimeters in diameter covering an area of 1.13 square centimeters. Each amplifier provided an average output of 40 joules, for a total energy at the target of 80 Joules (70.7 Joules per square centimeter).

The target surface was coated to absorb the laser energy, and thus avoid any possible melting at the surface. The standard procedure was to spray the surface first with Krylon metal primer paint, which is a red oxide primer, until no bare metal was visible through the paint. After the red primer had dried, Krylon flat black spray enamel was sprayed over it in two multi-pass steps. No red primer was visible after the first multi-pass spraying.

The primer usually applied was Krylon Ruddy Brown Primer 1317, spray primer for metal, resistant to rusting. In addition to the red oxide pigment, it contains several solvents including acetone, toluene, propane VM&P naphtha, and isobutyl alcohol. The enamel usually applied was Krylon 1602 Ultra-flat Black Interior-/Exterior Enamel. It contains about 32 weight percent pigments. (half carbon black, half silicates) 59 percent solvents, and 9 percent resins. The solvents include acetone, propane, methyl ethyl ketone, PM acetate, xylene, toluene, methyl isobutyl ketone, and butyl alcohol. Both Krylon products are manufactured by Borden, Inc. of Columbus, Ohio.

After it had dried, the sample target was loaded into a holding fixture. Each sample was thick enough that no backup or impedance matching material was necessary to eliminate or minimize any back reflected shock pulse, which in thinner targets could appreciably reduce the net amount of residual stress stored at the shock surface.

A transparent overlay material was provided over the flat black paint to confine the shock pulse and direct it into the sample. Typically the overlay comprised flowing water, introduced at a convenient location above the area to be hit by the laser beam and adjusted so that it spread out into a substantially flat uniform sheet approximately one millimeter thick as it flowed over the area to be laser shock processed.

Depending on the material, size, and shape of the target, and the desired results, the sample was hit either on one side only or on both sides simultaneously. Earlier tests had been run at high energy fluences, which reduce the number of shots required to reach a given level of processing. This was accomplished by reducing the spot size, and thereby raising the energy fluence. Energy fluences of about 130 to 150 Joules per square centimeter were achieved by using a spot 6 millimeters in diameter with an input of about 40 Joules. This method is useful where higher energy fluences are necessary to produce the desired compressive residual stress profile in the material; where smaller diameter spots will cover the area to be processed; and where a convenient number of multiple overlapping spots can cover the area.

Where desired, with a selected spot size, lower energy fluences were obtained by attenuating optical filters in the path of the laser beam.

EXAMPLE A

Sharpened Laser Pulses

Iron powder metal samples were laser shock processed using both an unsharpened laser pulse and a laser pulse sharpened with an aluminum film. These samples underwent residual stress analysis to determine the effects of using sharpened versus unsharpened laser pulses.

The samples treated with an unsharpened pulse did not develop compressive residual surface stresses in excess of those present on unprocessed "baseline" samples. Samples laser processed with a sharpened laser pulse did exhibit significant increases in compressive residual surface stresses over the baseline values. In addition, the residual stresses developed from sharpened pulses extended for greater depths into the samples. The results of this analysis are given in Table 2. Negative values in the tables represent compressive stresses.

EXAMPLE B

Overlapped Laser Pulses

In order to process large areas, it is necessary to "overlap" the laser pulses. The term "overlap" refers to the situation where the location of a subsequent laser irradiation is offset from the previous pulse in such a manner that only a portion of the first area is irradiated a second time. By overlapping pulses, larger areas may be treated.

The effect of using two overlapped laser pulses on the residual stress state developed in a pearlitic ductile cast iron test bar was investigated. The approximate geometry of the residual stress test specimen, the configuration of the overlapped pulses used, and the locations of the 20 residual stress measurements are shown in FIG. 6.

As shown in FIG. 6, each laser pulse (having an energy fluence of 70.7 Joules per square centimeter) was 0.45 inch (11.4 millimeters) in diameter and the overlapped pulse centers were offset 0.25 inch (6.4 millimeters). The second pulse was applied about a minute after the first. The residual stress measurements were made down the center of the specimen at the longitudinal locations denoted by the X's. The residual stresses measured at these locations are given in Table 3. These measurements indicate that the overlapped region develops equal or greater compressive residual surface stresses as compared to the non-overlapped areas. It was noted also that the residual stresses extend slightly beyond the laser irradiated area edges. Residual stress typical of the untreated surface is less than −15 ksi (absolute value) as shown in Table 5.

TABLE 3

SURFACE RESIDUAL STRESSES MEASURED ON PEARLITIC DUCTILE CAST IRON SAMPLE PROCESSED WITH OVERLAPPED LASER PULSES. FIG. 6 RELATES THE POSITION OF THE LASER PULSE LOCATION TO EACH MEASURED RESIDUAL STRESS.

| Location Inches | Residual Stress, ksi |
|---|---|
| 0.00 | −59.9 |
| 0.04 | −65.1 |
| 0.08 | −64.9 |
| 0.12 | −59.1 |
| 0.16 | −61.8 |
| 0.25 | −74.8 |
| 0.29 | −71.8 |
| 0.33 | −69.8 |

TABLE 2

RESIDUAL STRESSES MEASURED ON IRON POWDER METALLURGY SAMPLES COMPARING SHARPENED AND UNSHARPENED LASER PULSES

| Nominal Energy Per Pulse (J/cm²) | Number of Pulses | Measured Residual Stresses in Kilopounds per square inch (ksi) at Indicated Depths in Inches | | | | | |
|---|---|---|---|---|---|---|---|
| | | Surface | 0.002 | 0.005 | 0.010 | 0.020 | 0.030 |
| Before Treatment | | | | | | | |
| — | — | Up to −34.1 | — | — | — | — | — |
| Shock Treated, Pulses Not Sharpened | | | | | | | |
| 20 | 10 | −7.3 | 4.7 | 1.6 | 1.2 | 0 | −0.4 |
| 50 | 5 | −26.0 | 4.1 | 1.8 | 0.2 | −1.0 | −1.9 |
| 100 | 5 | 3.5 | 3.8 | 1.8 | 1.7 | −1.0 | −0.9 |
| Shock Treated, Sharpened Pulses | | | | | | | |
| 30 | 10 | −23.4 | −14.8 | −8.6 | −7.2 | −5.6 | −3.9 |
| 50 | 1 | −17.2 | −8.6 | −2.2 | −1.5 | −1.5 | −3.2 |
| 100 | 8 | −55.8 | −31.7 | −20.5 | −18.5 | −14.5 | −9.8 |
| 160 | 4 | −45.5 | −31.3 | −25.1 | −23.9 | −14.4 | −11.6 |
| 150 | 2 | −41.8 | −28.8 | −17.3 | −13.1 | −9.3 | −5.6 |
| 90 | 6 | −44.5 | −26.6 | −17.9 | −15.7 | −13.3 | −10.0 |
| 65 | 10 | −50.0 | −20.9 | −17.9 | −12.6 | −10.4 | −8.7 |

TABLE 3-continued

SURFACE RESIDUAL STRESSES MEASURED ON PEARLITIC DUCTILE CAST IRON SAMPLE PROCESSED WITH OVERLAPPED LASER PULSES. FIG. 6 RELATES THE POSITION OF THE LASER PULSE LOCATION TO EACH MEASURED RESIDUAL STRESS.

| Location Inches | Residual Stress, ksi |
|---|---|
| 0.37 | −54.7 |
| 0.41 | −61.2 |
| 0.46 | −64.3 |
| 0.50 | −61.5 |
| 0.54 | −55.4 |
| 0.58 | −61.3 |
| 0.62 | −61.1 |
| 0.71 | −58.6 |
| 0.75 | −62.4 |
| 0.79 | −59.8 |
| 0.83 | −59.6 |
| 0.87 | −66.5 |

EXAMPLE C

Multiple Pulses

Multiple pulses under a fluorescence envelope give a higher effective pulse rate, which translates to a higher processing rate. For best results the paint coating should remain unimpaired for all of the pulses, because there is not enough time to recoat in the 100 to 200 microseconds between pulses under the fluorescence envelope. Most of the recent work was done with multiple shots on the same paint. About three shots usually are the limit between recoatings at 150 Joules per square centimeter, and as many as about 20 shots at 20 Joules per square centimeter.

The magnitude of the compressive residual surface stress retained after laser shock processing may be increased by either increasing the laser pulse energy or by processing a location with multiple pulses. Under some circumstances, the laser pulse energy necessary to impart the desired magnitude of residual stresses may be such that it is impractical to achieve with a single pulse. Therefore, the ability to increase the level of residual stress by using multiple pulses is critical to widespread use of this technology.

A series of tests were conducted on iron powder metal samples processed at 100 Joules per square centimeter. Two areas were processed with a single pulse, and two areas were processed with five pulses. The residual stresses measured for these different processing conditions are given in Table 4. The results demonstrate that multiple pulses on a given area impart additional residual stresses beyond those developed from the first pulse. Also the residual stresses from multiple pulses extend deeper into the sample than those from a single pulse.

TABLE 4

RESIDUAL STRESSES MEASURED ON IRON POWDER METAL-LURGY SAMPLES COMPARING SINGLE AND MULTIPLE PULSE OF A GIVEN PULSE ENERGY.

| Pulse Energy J/cm$^2$ | Number of Pulses | Residual Stress in ksi, at Indicated Depth in Inches | | | | |
|---|---|---|---|---|---|---|
| | | Surface | 0.002 | 0.005 | 0.010 | 0.020 | 0.030 |
| 100 | 1 | −22.7 | −12.2 | −10.0 | −9.1 | −6.9 | −4.8 |
| 100 | 1 | −28.3 | −12.8 | −13.6 | −6.9 | −8.0 | −5.8 |
| 100 | 5 | −60.8 | −23.9 | −20.3 | −18.4 | −14.3 | −13.9 |
| 100 | 5 | −67.0 | −23.4 | −19.4 | −19.4 | −15.0 | −13.3 |

EXAMPLE D

Strengthened Glass

Using strengthened glass in the amplifier, the pulse rate that can be applied safely before thermal fracture would be likely to occur can be about five times faster than for unstrengthened glass.

A pearlitic ductile cast iron test bar was laser shock processed with strengthened glass rods This material responded well to processing, it developed significant compressive residual surface stresses. The residual stresses developed are given in Table 5.

These results demonstrate that strengthened glass rods, which are necessary to achieve the high repetition rates required of a commercial device, produce residual stress levels similar to those obtained with unstrengthened glass rods

TABLE 5

RESIDUAL STRESS MEASURED ON A PEARLITIC DUCTILE CAST IRON BAR PROCESSED WITH Q89 STRENGTHENED GLASS RODS IN THE AMPLIFIERS

| Pulse Energy, J/cm$^2$ | Number of Pulses | Residual Stress in ksi, at Indicated Depth in Inches | | | |
|---|---|---|---|---|---|
| | | Surface | 0.001 | 0.005 | 0.010 |
| Baseline | — | −13.5 | 9.0 | 1.2 | 2.2 |
| 50 | 1 | −17.0 | −11.9 | −10.5 | −9.2 |
| 100 | 1 | −70.9 | −48.8 | −26.7 | −15.8 |
| 100 | 5 | −83.9 | −58.3 | −43.6 | −39.6 |
| 140 | 1 | −77.0 | −40.6 | −30.1 | −23.2 |

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

We claim:

1. A method of improving properties of a solid material by providing shock waves therein, comprising
   directing to the surface of the material a plurality of pulses of coherent radiation having average energy fluence of at least about 10 Joules per square centimeter and rise time of not longer than about 5 nanoseconds within a fluorescence envelope lasting about 0.5 to 5 milliseconds, at a rate of about one radiation pulse per 100 to 200 microseconds.

2. A method as in claim 1, wherein the leading edge of each radiation pulse is sharpened by providing in the path of the pulse a metallic film about 150 to 5000 angstroms thick that is vaporized by the pulse.

3. A method as in claim 2, wherein the metallic film is moved across the path of the radiation pulses so that a later pulse strikes an area of the film not already vaporized by an earlier pulse.

4. A method as in claim 2, wherein the metallic film comprises a coating of aluminum on a supporting film that is substantially transparent and nondistorting to the radiation wavefront.

5. A method as in claim 4, wherein the supporting film comprises a strong polyester material 6. A method as in claim 4, wherein the supporting film comprises oriented, at least partially crystalline, polyethylene terephthalate, and is not thicker than about 10 wavelengths of the radiation.

7. A method as in claim 2, wherein a radiation pulse vaporizes an area of the metallic film of about 0.1 to 0.2 square millimeters in about 0.1 to 3 nanoseconds, after which the area of vaporization may expand to about 1 to 1000 square millimeters in about 2 to 10 nanoseconds.

8. A method a: in claim 7, wherein the radiation comprises a beam about 0.1 to 1000 square millimeters in cross-section.

9. A method as in claim 1, wherein the solid material is metallic.

10. A method as in claim 1, wherein a laser provides the coherent radiation.

11. A method as in claim 10, wherein a flashlamp pulse forming network forms a substantially rectangular fluorescence envelope.

12. A method as in claim 1, wherein the coherent radiation is generated by an oscillator comprising a rear mirror, a laser pump cavity including a laser rod; a polarizer, a pockels cell, and an output coupler.

13. A method as in claim 12, wherein the laser pump cavity comprises a gain medium pumped by flashlamps that are driven at regular intervals of about 0.5 to 10 seconds by a pulse forming network.

14. A method as in claim 13, wherein the gain medium comprises a neodymium-glass laser rod.

15. A method as in claim 12, wherein the coherent radiation from the laser pump cavity is linearly polarized, and the polarizer breaks the radiation down into two linearly polarized orthogonal components, one of which (component B) it reflects away and the other (component A) it transmits on to the pockels cell.

16. A method as in claim 15, wherein a predetermined difference in potential is provided across the pockels cell to retard the coherent radiation one-fourth wavelength (90 degrees) while transmitting it on to the output coupler, which reflects about onehalf of it back toward the polarizer, the reflected energy proceeds back through the pockels cell with a further retardation of onefourth wavelength (90 degrees), so that the back radiation is onehalf wavelength (180 degrees) out of phase with the forward radiation of component A, thus having the opposite polarization (B), and it is reflected away by the polarizer, so as not to return to the laser pump cavity, and thus laser energy builds up and is stored in the laser rod of the pump cavity, because oscillations cannot occur.

17. A method as in claim 16, wherein, after at least about 100 microseconds, the difference in potential across the pockels cell is reduced to zero for about 1 to 5 microseconds; and the reduction of potential difference across the pockels cell is repeated at intervals of about 100 to 200 microseconds thereafter; so that, while the potential difference is reduced, the pockels cell does not retard the radiation, and the oscillator produces about 2 to 50 laser pulses in each fluorescence envelope, with sufficient time between pulses for stored energy to build up in the laser rod, while keeping fluorescent losses to a minimum.

18. A method as in claim 17, wherein the output coupler comprises a partially reflective mirror that transmits about half of the energy in each pulse on to a pulse sharpener comprising a coating of aluminum about 150 to 5,000 angstroms thick on a supporting film comprising a strong polyester material that is substantially transparent and thin enough to be non-distorting to the radiation wavefront.

19. A method as in claim 18, wherein the supporting film comprises oriented at least partially crystalline, polyethylene terephthalate, about 1 to 40 micrometers thick, and the pulse sharpener is positioned so that the optical axis of the supporting film is oriented to correspond with the polarization of the radiation.

20. A method as in claim 18, wherein each pulse passes through the pulse sharpener, is directed onto amplifying means and from there to the solid material to be treated, and the amplified radiation pulse is focussed by a positive lens onto a desired area of the surface of the material to provide an average power flux therein of at least about $10^7$ watts per square centimeter, with pulse length of about 10 to 1,000 nanoseconds, and below the power flux that would form a reflecting plasma at the surface of the material.

21. A method as in claim 18, wherein the film is moved rapidly to provide a different region of the film, not already vaporized, in the path of the radiation before the next pulse is generated.

22. A method as in claim 21, wherein the film is moved at a predetermined speed by means comprising a cylindrical drum that rotates about its axis at a speed high enough to provide the required rate of movement in the film, which is mounted just inside the periphery of the drum, between a supply spool and a drive spool.

23. A method as in claim 22, wherein, during part of each revolution of the drum, an entry slot and an exit slot, provided at opposite sides of the drum, cross the path of the radiation pulses; so that several pulses in succession proceed in through the entry slot, strike the aluminum film, vaporizing it, and continue out from the exit slot and on to the surface of the material to be treated.

24. A method as in claim 23, wherein, at a predetermined time, just before the slots begin to cross the path of the laser radiation, actuating means on the drum triggers a timing pulse that fires the flashlamps in the laser pump cavity when the slots begin to cross the path of the laser beam, so that several laser pulses in succession strike the aluminum film, each in a different area of the film, and proceed to the surface of the material to be treated.

25. A method as in claim 24, repeated periodically, with the actuating means turned off during each interim between repetitions.

26. A method as in claim 25, wherein the film is advanced by the drive spool during the interims between repetitions, to move a new region of the film in line with the entry slot.

27. A method as in claim 25, wherein the film is advanced continuously by the drive spool to provide a different portion of the film's surface for each series of pulses.

28. A method as in claim 16, wherein, after at least about 100 microseconds, the difference in potential across the pockels cell is reduced to zero for about 1 to 5 microseconds; and while the potential difference is reduced, the pockels cell does not retard the radiation, and the oscillator produces a laser pulse in each fluorescence envelope, with sufficient time therein before the pulse for stored energy to build up in the laser rod, while keeping fluorescent losses to a minimum.

29. A method as in claim 28, wherein the output coupler comprises a partially reflective mirror that transmits about half of the energy in the pulse on to a pulse sharpener comprising a coating of aluminum about 150 to 5,000 angstroms thick on a supporting film comprising a strong polyester material that is substantially transparent and thin enough to be non-distorting to the radiation wavefront.

30. A method as in claim 29, wherein the supporting film comprises oriented, at least partially crystalline, polyethylene terephthalate, about 1 to 40 micrometers thick.

31. A method as in claim 29, wherein the pulse passes through the pulse sharpener and through a second polarizer, is directed onto amplifying means and from there to the solid material to be treated, and the amplified radiation pulse is focussed by a positive lens onto a desired area of the surface of the material to provide an average power flux therein of at least about $10^7$ watts per square centimeter, with pulse length of about 10 to 1,000 nanoseconds, and below the power flux that would form a reflecting plasma at the surface of the material.

32. A method as in claim 28, wherein the laser pump cavity, the first mentioned polarizer, a second pockels cell, and a second output coupler form a second oscillator by means of which the other radiation component (B) provides a sharpened pulse by way of a second pulse sharpener and a second polarizer, to amplifying means, and from there to the solid material to be treated.

33. A method as in claim 32, wherein the operation of the second oscillator is similar to that of the first mentioned oscillator, the second oscillator also provides an approximately rectangular fluorescence envelope lasting about 0.5 to 5 milliseconds, and the coherent radiation from the laser pump cavity is linearly polarized.

34. A method as in claim 33, wherein the first mentioned polarizer breaks the radiation down into two linearly polarized orthogonal components, one of which (component B) it reflects to the second pockels cell, and the other (component A) it transmits on to the first mentioned pockels cell.

35. A method as in claim 34, wherein a predetermined difference in potential is provided across the second pockels cell to retard the coherent radiation one-fourth wavelength (90 degrees) while transmitting it on to the second output coupler, which reflects about one-half of it back toward the first mentioned polarizer, the reflected energy proceeds back through the second pockels cell with a further retardation of one-fourth wavelength (90 degrees), so that the back radiation is one-half wavelength (180 degrees) out of phase with the forward radiation of component B, thus having the opposite polarization (A), and it is transmitted away through the first mentioned polarize, so as not to return to the laser pump cavity, so there can be nc oscillation and laser energy builds up and is stored in the laser rod of the pump cavity.

36. A method as in claim 35, wherein, at a predetermined instant, at least about 100 microseconds after the pulse is produced by the first mentioned oscillator, the difference in potential across the second pockels cell is reduced to zero for about 1 to 5 microseconds; and while the potential difference is reduced, the second pockels cell does not retard the radiation, and the second oscillator produces a second laser pulse in each fluorescence envelope, with sufficient time between the first and second pulses for stored energy to build up in the laser rod, while keeping fluorescent losses to a minimum.

37. A method as in claim 36, wherein the second output coupler comprises a partially reflective mirror that transmits about half of the energy in the second pulse on to a second pulse sharpener comprising a coating of aluminum about 150 to 5,000 angstroms thick on a supporting film comprising a strong polyester material that is substantially transparent and thin enough to be non-distorting to the radiation wavefront.

38. A method as in claim 37, wherein the supporting film in the second pulse sharpener comprises oriented, at least partially crystalline, polyethylene terephthalate, about 1 to 40 micrometers thick.

39. A method as in claim 37, wherein the second pulse passes through the second pulse sharpener, is directed onto amplifying means and from there to the solid material to be treated, and the amplified radiation pulse is focussed by a positive lens onto a desired area of the surface of the material to provide an average power flux therein of at least about $10^7$ watts per square centimeter, with pulse length of about 10 to 1,000 nanoseconds, and below the power flux that would form a reflecting plasma at the surface of the material.

40. A method as in claim 39, wherein the second radiation pulse strikes the target about 100 to 200 microseconds after the first pulse.

41. A method as in claim 40, wherein the process is repeated about every 0.5 to 10 seconds.

42. A method as in claim 41, wherein the film in each pulse sharpener is moved, at least between repetitions of the process, at a speed sufficient to provide a different area of the film in the path of each pulse.

43. A method as in claim 42, wherein each film is moved continuously.

44. A method as in claim 1, wherein a substantially transparent overlay material is provided in intimate contact with the surface of the solid material while each pulse is directed thereto.

45. A method as in claim 44, wherein the overlay material is replaced between pulses 46. A method as in claim 45, wherein the overlay material comprises a liquid that is delivered to the surface at high speed either continuously or in pulses.

47. Apparatus for improving properties of a solid material by providing shock waves therein, comprising means for providing, and means for directing to the surface of the material, a plurality of pulses of coherent radiation having average energy fluence of at least about 10 Joules per square centimeter and rise time of not longer than about 5 nanoseconds within a fluorescence envelope lasting about 0.5 to 5 milliseconds, at a rate of about one radiation pulse per 100 to 200 microseconds.

48. Apparatus as in claim 47, wherein the pulse providing means comprises laser oscillator means and laser amplifying means.

49. Apparatus as in claim 48, wherein the amplifying means comprises an amplifier rod consisting essentially of strengthened phosphate laser glass.

50. Apparatus as in claim 49, wherein the amplifier rod comprises glass that was strengthened by an ion exchange process.

51. Apparatus as in claim 49, wherein the amplifier rod is capable of withstanding at least about five times the power per unit length of amplified rod that typical unstrengthened phosphate glass is capable of withstanding.

52. Apparatus as in claim 49, wherein the amplifier rod comprises Kigre Q-89 strengthened phosphate glass or a substantial equivalent thereof.

* * * * *